United States Patent
Murarka et al.

(10) Patent No.: US 11,990,156 B2
(45) Date of Patent: May 21, 2024

(54) SCENE-BASED EDIT SUGGESTIONS FOR VIDEOS

(71) Applicant: Adobe Inc., San Jose, CA (US)

(72) Inventors: Ankur Murarka, Bangalore (IN); Sneha Agarwal, Kolkata (IN); Anuradha, Bangalore (IN)

(73) Assignee: Adobe Inc., San Jose, CA (US)

( * ) Notice: Subject to any disclaimer, the term of this patent is extended or adjusted under 35 U.S.C. 154(b) by 139 days.

(21) Appl. No.: 17/856,180

(22) Filed: Jul. 1, 2022

(65) Prior Publication Data
US 2024/0005960 A1    Jan. 4, 2024

(51) Int. Cl.
*G11B 27/031*    (2006.01)
*G06V 20/40*    (2022.01)

(52) U.S. Cl.
CPC ............ *G11B 27/031* (2013.01); *G06V 20/41* (2022.01); *G06V 20/46* (2022.01); *G06V 20/49* (2022.01)

(58) Field of Classification Search
USPC ....................................................... 386/282
See application file for complete search history.

(56) References Cited

U.S. PATENT DOCUMENTS

| | | | | |
|---|---|---|---|---|
| 6,330,345 B1* | 12/2001 | Russo | ................ | G06V 40/1347 358/463 |
| 6,587,575 B1* | 7/2003 | Windham | ............... | A22B 5/007 382/110 |
| 6,754,380 B1* | 6/2004 | Suzuki | .................. | G06T 7/0012 382/156 |
| 2004/0091135 A1* | 5/2004 | Bourg, Jr. | ............. | G06T 7/0004 382/110 |

* cited by examiner

*Primary Examiner* — Nigar Chowdhury
(74) *Attorney, Agent, or Firm* — Nicholson De Vos Webster & Elliott LLP

(57) ABSTRACT

Embodiments are disclosed for determining scene-based editing recommendations for video content. A method of determining scene-based editing recommendations for video content includes receiving an input video comprising video content, dividing the input video into the plurality of scenes based on the video content, identifying a representative frame for each scene, determining a plurality of editing settings for each representative frame, determining editing settings for each scene based on an effectiveness score, and generating an output video using the input video and the editing settings for each scene.

20 Claims, 12 Drawing Sheets

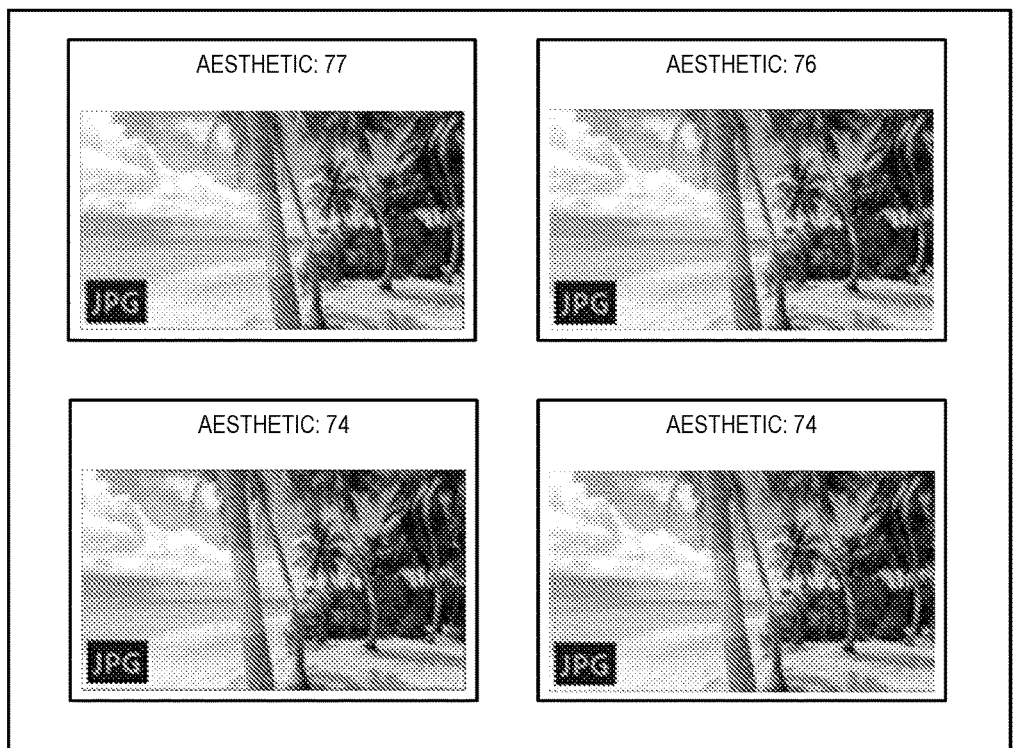
SCORES BEFORE PRESET APPLIED
500
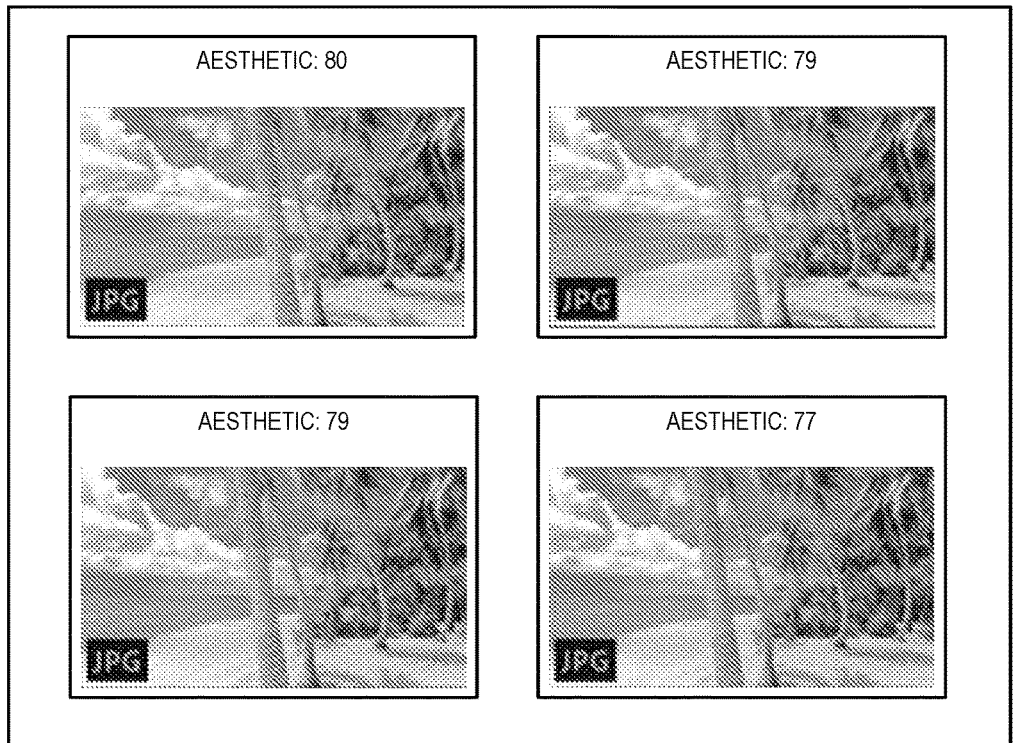
SCORES AFTER PRESET APPLIED
502
FIG. 5

```
<crs:SceneCorrections>
    <rdf:Seq>
        <rdf:li>
            <rdf:Description
                crs:StartTimestamp="04:34:22"
                crs:EndTimestamp="05:30:22"
                crs:CorrectionName="Scene 1"
                crs:Exposure2012="0"
                crs:Contrast2012="0.12"
                crs:Highlights2012="0"
                crs:Shadows2012="-0.17"
                crs:Whites2012="-0.29"
                crs:Blacks2012="0.14"
                crs:Clarity2012="0"
            ></rdf:Description>
        </rdf:li>
        <rdf:li>
            <rdf:Description
                crs:StartTimestamp="05:30:22"
                crs:EndTimestamp="06:40:22"
                crs:Exposure2012="-0.0875"
                crs:Contrast2012="0.08"
                crs:Highlights2012="0.23"
                crs:Shadows2012="0"
                crs:Whites2012="0"
                crs:Blacks2012="0"
                crs:Clarity2012="0"
            ></rdf:Description>
        </rdf:li>
    </rdf:Seq>
</crs:SceneCorrections>
```

Labels: 700, 702, 704, 706, 708, 710, 712

FIG. 7

SCENE-BASED EDIT SUGGESTIONS FOR VIDEOS

BACKGROUND

As image capture and computing device technology has improved, increasingly powerful video capture and editing tools have become available to professional users and consumers. This has led to a boom of content creation. Users can now quickly capture and edit videos and then share the video with others (e.g., via social media or other channels). Video editing tools provide a variety editing functions that let the user manipulate their video content, such as color grading, lens corrections, white balance, saturation, brightness, etc. Additionally, such tools provide various transforms, corrections, filters, etc. which the user can choose to apply to their video. Editing video using these tools typically involves a manual process of trial and error to identify the best edits to be made at the appropriate times in the video content. This results in a generally cumbersome workflow which also requires specialized knowledge or experience to ensure that the best edits are applied to video content.

SUMMARY

Introduced here are techniques/technologies that provide scene-based editing recommendations for video content. In particular, in one or more embodiments, the disclosed systems and methods comprise a video editing recommendation system that receives a video to be edited. The video is automatically divided into scenes which are each edited separately. For example, scenes are identified based on their visual characteristics. Scenes with different visual characteristics likely cannot be edited using the same editing settings while expecting the same quality result. Accordingly, recommended editing settings are then determined for each scene separately. For example, a machine learning model is used to identify a representative frame for each scene which most accurately represents the visual characteristics of the scene as a whole.

Using the representative frames, the performance of the presets is analyzed. For example, an aesthetics machine learning model determines a score for each frame before and after applying a preset. These scores are used to determine how effective the preset is across the entire scene. The presets that perform well are retained while those performing poorly are discarded. The resulting list of recommended presets is then presented to the user to select one preset per scene. Once selected, each scene is separately edited, and the edited scenes are then combined to generate an edited output scene. This improves the visual quality of the output video without requiring the user to manually divide the input video into scenes and manually edit each scene separately.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 5 illustrates an example of aesthetic scores for frames before and after editing settings have been applied, in accordance with one or more embodiments;

FIG. 7 illustrates an example of a scene-based editing data structure, in accordance with one or more embodiments;

DETAILED DESCRIPTION

Figure 1:
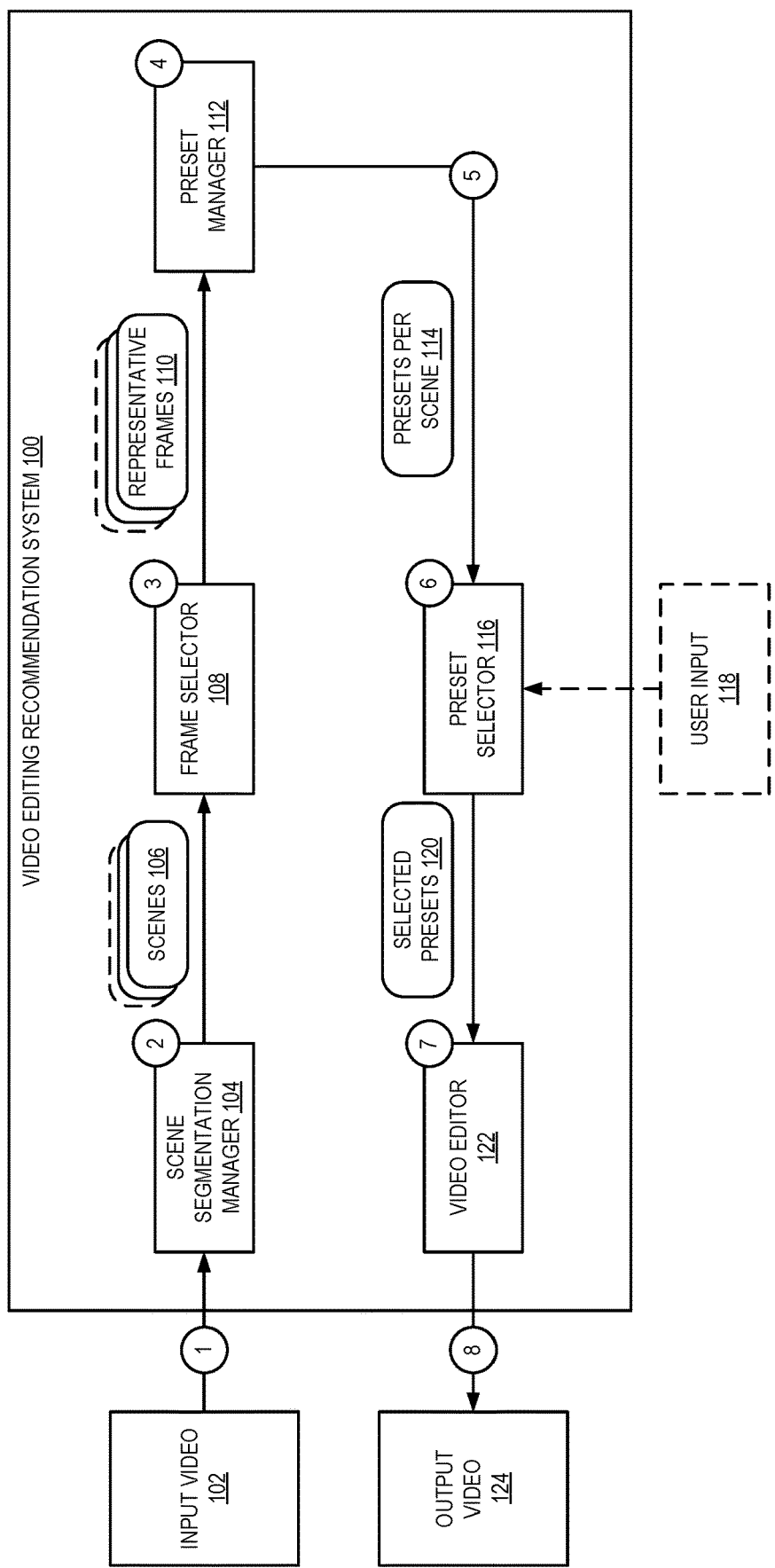
FIG. 1 illustrates a diagram of a process of determining scene-based edit suggestions for video data in accordance with one or more embodiments.

One or more embodiments of the present disclosure include a video editing system which provides scene-based editing recommendations based on the content of the scenes. Conventional video editing system enable a user to specify editing settings for a video file. However, it is difficult to find editing settings that work for all frames in the video. Typically, the user is shown one frame, and then the same edited frame once their editing settings have been applied. If the user finds these changes acceptable, then the same settings are applied to the entire video. However, while these settings may be effective for the shown frame, they do not necessarily improve the appearance of other frames. For example, changing the exposure value to improve the appearance of one frame can result in other frames being over- or under-exposed. Similarly, videos often include multiple scenes. Different scenes are often shot at different locations, under different lighting conditions, etc. As a result, the edits that improve the appearance of one scene do not necessarily improve the appearance of different scenes. Conventional video editing systems do not enable scene-specific editing. Instead, they require the user to manually divide a video into multiple scenes, apply separate edits to each scene, and then recombine the edited scenes to make the edited video. This is both time consuming and requires specialized skills by the editor to ensure that an acceptable edited video is produced.

Embodiments address the deficiencies in conventional techniques by automatically dividing a video into its component scenes and providing scene-specific editing recommendations. For example, scenes are identified by changes in the visual characteristics of the frames of the video. Such changes often indicate a change in location, lighting, or other characteristics which make applying the same editing settings challenging. For instance, a video that starts in an exterior location and ends in an interior location will have different visual characteristics as the result of different lighting, different backgrounds, etc. Scenes are identified by the start and end frames of the scene (e.g., using timestamps). Unlike in conventional techniques, this is performed automatically, without requiring the user to manually identify scenes and generate separate video files.

With the scenes identified, scene-specific editing settings are then determined. For example, a machine learning model is used to analyze a representative frame from each scene which accurately represents the visual characteristics of the scene as a whole. Using the representative frame, the machine learning model identifies similar images and corresponding editing settings to be used for editing. Because this can result in a large number of sets of editing settings (also referred to as presets), the recommended editing settings are pruned based on their performance. For example, an effectiveness score is calculated for each preset for its scene. Those presets that perform well are presented to the user, while poor performing presets are discarded. Once the user has selected the preset to use for each scene, the scenes are edited and combined into an output video.

Term Definitions

As used herein, the term "video" or "digital video" refers to digital data representative of a sequence of visual images. In particular, a digital video includes a sequence of images which may include corresponding digital audio. For example, the term "digital video" includes, but is not limited to, digital files having one of the following file extensions: AVI, FLV, WMV, MOV, MP4. Similarly, as used herein, the term "frame" (or "frame of a digital video") refers to a digital image from a digital video.

As used herein, the term "image" or "digital image" refers to a digital graphics file that when rendered displays one or more objects. In particular, the term "image" comprises a digital file that, when rendered, includes visual representations of one or more objects, such as a person. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device. In some embodiments, an image refers to a frame of a digital video.

As used herein, the term "scene" refers to a series of consecutive frames of a digital video that share common visual characteristics, such as color composition. A digital video includes one or more scenes. Scenes are identified using scene detection techniques which identify variations in the content of frames of the video. As used herein, the term "representative frame" refers to a frame of a scene that best reflects the visual characteristics of the scene as a whole.

As used herein, the term "preset" refers to a set of editing settings that are applied to an image and/or video. The editing settings are used to manipulate attributes of the image and/or video. Examples attributes include exposure, contrast, white balance, highlights, clarity, etc. Presets are stored in a data structure which allows for the set of editing settings used for one image or video to be stored and applied to another image or video.

As used herein, the term "effectiveness score" refers to a numerical representation of the aesthetic improvements made to an image or video when applying a preset during editing. An effectiveness score is calculated for each frame of a scene based on an aesthetic score determined before the edits are applied and after the edits are applied. An average effectiveness score is computed for a given preset by combining the effectiveness score for each frame of the scene. This allows for the relative performance of each preset across a scene to be compared quantitatively.

As used herein, a "neural network" refers to a machine-learning model that can be tuned (e.g., trained) based on training input to approximate unknown functions. In particular, a neural network includes a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

FIG. 1 illustrates a diagram of a process of determining scene-based edit suggestions for video data in accordance with one or more embodiments. Embodiments include a video editing recommendation system 100 which uses machine learning to determine scene-based edit recommendations for video data. Accordingly, embodiments auto-segment an input video file into scenes before identifying recommended editing settings for each scene. In some embodiments, the user selects from multiple recommendations for all or some of the scenes. Once edited, the video editing recommendation system 100 merges the edited scenes to generate the edited output video.

As shown in FIG. 1, the video editing recommendation system 100 receives an input video 102 at numeral 1. In some embodiments, the video editing recommendation system 100 is implemented as part of a digital video editing system. The input video 102 is a digital video that is selected by a user (e.g., a content creator, editor, etc.) for editing. In some embodiments, the input video is locally stored with, or remotely accessible by, the video editing recommendation system. For example, in some embodiments, the user selects the video by browsing a file system to locate the input video, providing an identifier associated with the input video 102 (e.g., a URL, URI, etc.), etc.

In some embodiments, the user opens the input video in the video editing recommendation system 100 to begin editing. Alternatively, the user opens the input video in a video editing system in which the video editing recommendation system 100 is implemented. Once loaded, the user begins editing the input video using the video editing recommendation system 100 (e.g., by selecting a video editing recommendation icon in a user interface, or via other user interface interactions). When the input video is received by the video editing recommendation system 100, it is processed by scene segmentation manager 104, at numeral 2. The scene segmentation manager identifies different scenes within the input video 102. As discussed, different scenes often require different edits, as the edits made to one scene do not necessarily improve a different scene. The scene segmentation manager 104 performs temporal segmentation on the input video by detecting transitions between scenes.

In some embodiments, scene segmentation uses histogram difference to detect the transitions. Histogram difference is based on the color histogram differences between the two consecutive frames. In some embodiments, histogram difference is computed for each channel (e.g., RGB, or other color channels) and the difference is then summed up. Histogram difference is defined as:

$$HistDif[i] = \sum_{j=1}^{M} |h_i(j) - h_{i-1}(j)|$$

where $h_i$ is a histogram with M bins of the $i^{th}$ frame of the digital video. If the HistDif[i] value is above a threshold, then the time stamp of the $i^{th}$ frame is marked as a separator between two scenes. The histogram differences technique assigns consecutive frames with similar colors to be part of the same scene. As a result, suggested edits are likely to be suitable for all frames of the scene as they share similar color composition. The timestamps are then used to identify a plurality of scenes 106 of the input video.

At numeral 3, a frame selector 108 determines a representative frame 110 associated with each scene 106. For each scene, $S_i$, in set of scenes, $S_n$, the frame selector 108 identifies a representative frame using a machine learning model. For example, the frames associated with a scene are extracted and provided to a frame selection model. The frame selection model outputs a quality score associated with each frame. The frame associated with the highest quality score is then identified by the frame selector 108 as the representative frame. This process is repeated for each scene, resulting in a representative frame 110 being identified for each scene. These are then passed to preset manager 112.

Preset manager 112 identifies editing settings (also referred to as "edit presets") for each representative frame, at numeral 4. In some embodiments, a machine learning model (e.g., a preset selection model) receives a representative frame and outputs a set of recommended presets based on the content of the input image. For example, in some embodiments, the representative frame is resized to an input resolution associated with the machine learning model. Alternatively, the representative frame is input at its full resolution. In some embodiments, there are multiple machine learning models, each associated with a different input resolution and trained to identify presets for images of a specific resolution. In some embodiments, the preset selection model generates a content embedding for the representative frame and matches the representative frame to images from an image corpus using the content embedding. Each matched image is associated with editing settings and the editing settings are returned as presets per scene 114. These presets are provided to preset selector 116 at numeral 5.

At numeral 6, preset selector 116 identifies a preset to be used to edit each scene. In some embodiments, the presets 114 are presented to a user via a graphical user interface (GUI). The user then selects (e.g., via user input 118) the preset to be used for each scene. In some embodiments, preset selector 116 calculates an aesthetic score for each preset and prunes the presets based on the aesthetic score. The user then selects a preset for each scene from among the pruned presets. This simplifies the selection by the user by removing presets that do not result in improved aesthetics for the scenes.

Once the selected presets 120 have been identified, they are provided to video editor 122 at numeral 7. The video editor 122 facilitates the generation, modification, accessing, storing, and/or deletion of digital video content. For example, in some embodiments, the video editor 122 edits each scene of the input video using the selected presets. In various embodiments, the selected presets include settings for exposure, contrast, white balance, highlights, clarity, etc. which are then applied to each scene using the timestamps identified above. Once the edits have been applied to the scenes by the video editor 122, the resulting edited output video 124 is output at numeral 8. For example, the edited output video 124 is presented to the user via the GUI who then chooses to keep the current changes, apply different presets to one or more of the scenes, etc.

Figure 2:
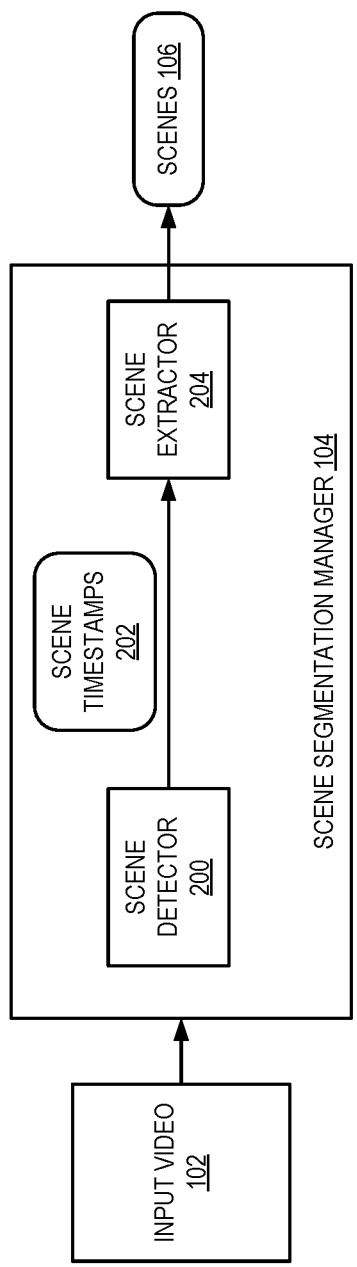
FIG. 2 illustrates a diagram of a process of scene segmentation in accordance with one or more embodiments.

FIG. 2 illustrates a diagram of a process of scene segmentation in accordance with one or more embodiments. As discussed, when an input video 102 is received, it is first divided into scenes by scene segmentation manager 104. As shown in FIG. 2, scene segmentation manager 104 includes a scene detector 200 and a scene extractor 204. Scene detector 200 identifies boundaries between scenes based on the content of the frames. As discussed, in some embodiments, histogram differences is used to identify the differences in color histograms between consecutive frames. When this difference is large enough (e.g., greater than a threshold value), the timestamp of the later frame is recorded as marking the start of a new scene. Alternative techniques for identifying scenes may also be used. For example, sum of absolute differences (SAD) is a technique that measures the similarity between image blocks. If the similarity is low (e.g., below a threshold) between consecutive frames, then this is used to identify a start of a new scene. Another technique for measuring the differences between frames is the edge change ratio (ECR). The ECR measures the dissimilarity between frames which can similarly be used to automatically identify when a new scene has started in video data.

As discussed above, the scene detector 200 implements one of various techniques to identify when a new scene has begun in the input video. The output of the scene detector 200 is a plurality of scene timestamps 202, corresponding to at least the start of each scene in the input video 102. In some embodiments, the scene timestamps 202 include both a start timestamp and an end timestamp. Alternatively, the scene timestamps are indexed by any identifier that is associated with a specific frame.

In some embodiments, a scene extractor 204 extracts the frames associated with each scene from the input video 102 using the scene timestamps 202. For example, the scene extractor 204, in some embodiments, creates new video files corresponding to each scene. These are then output as scenes 106. As discussed, each scene is then edited separately using scene specific editing settings and the edited scenes are then recombined to form the edited scene. Alternatively, in some embodiments, the scenes 106 include the input video and a corresponding editing file which includes the scene timestamps. Subsequently, the timestamps in the editing file are used to apply scene-specific editing settings to particular frames of the input video 102 corresponding to the identified scenes.

Figure 3:
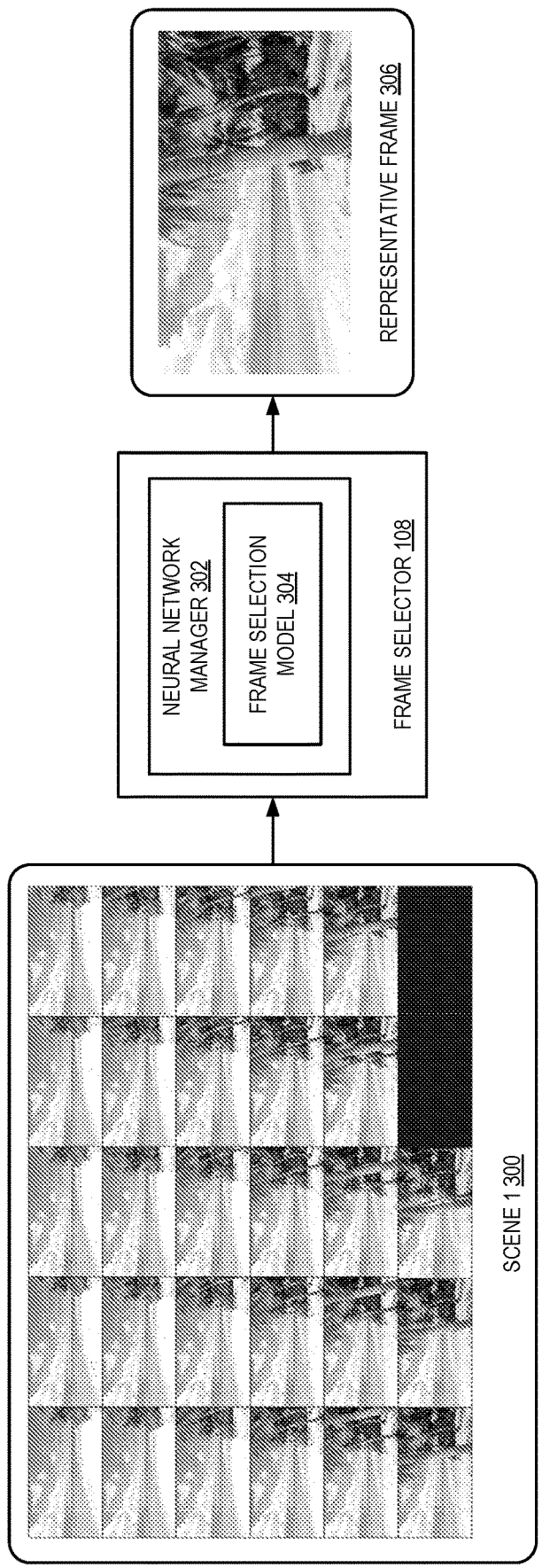
FIG. 3 illustrates a diagram of a process of determining a representative frame in accordance with one or more embodiments.

FIG. 3 illustrates a diagram of a process of determining a representative frame in accordance with one or more embodiments. As discussed, a scene includes a plurality of frames of a digital video which share common features. For example, in some embodiments, the frames of a scene have a similar color composition within a particular error threshold, as discussed above. In the example of FIG. 3, a scene, scene 1 300, is provided to frame selector 108 to identify a representative frame 306. As shown in FIG. 3, scene 1 300 includes a plurality of frames depicting a scene at a beach, with a substantial portion of the frames including depictions of the sky, the ocean, and the beach itself. As the frames progress in the scene, more and more of the trees become visible in the frame until the scene ends with roughly half the frame depicting trees with the other half depicting the beach, ocean, and sky.

Each frame is provided to frame selector 108 to identify a representative frame. As shown in FIG. 3, frame selector 108 includes neural network manager 302 which includes frame selection model 304. In some embodiments, neural network manager 302 hosts a plurality of neural networks or other machine learning models, such as frame selection model 304. The neural network manager 302 includes an execution environment, libraries, and/or any other data needed to execute the machine learning models. In some embodiments, the neural network manager 302 is associated with dedicated software and/or hardware resources to execute the machine learning models.

The frame selection model analyzes the frames associated with each scene and identifies the representative frame 306. In some embodiments, the frame selection model is a Siamese neural network trained to generate quality scores for frames of video. The difference between quality scores for any two frames indicates the estimated quality difference between those frames. Once the frame selection model has generated a quality score for each frame of the scene 300, the frame with the highest score is output as the representative frame 306.

Figure 4:
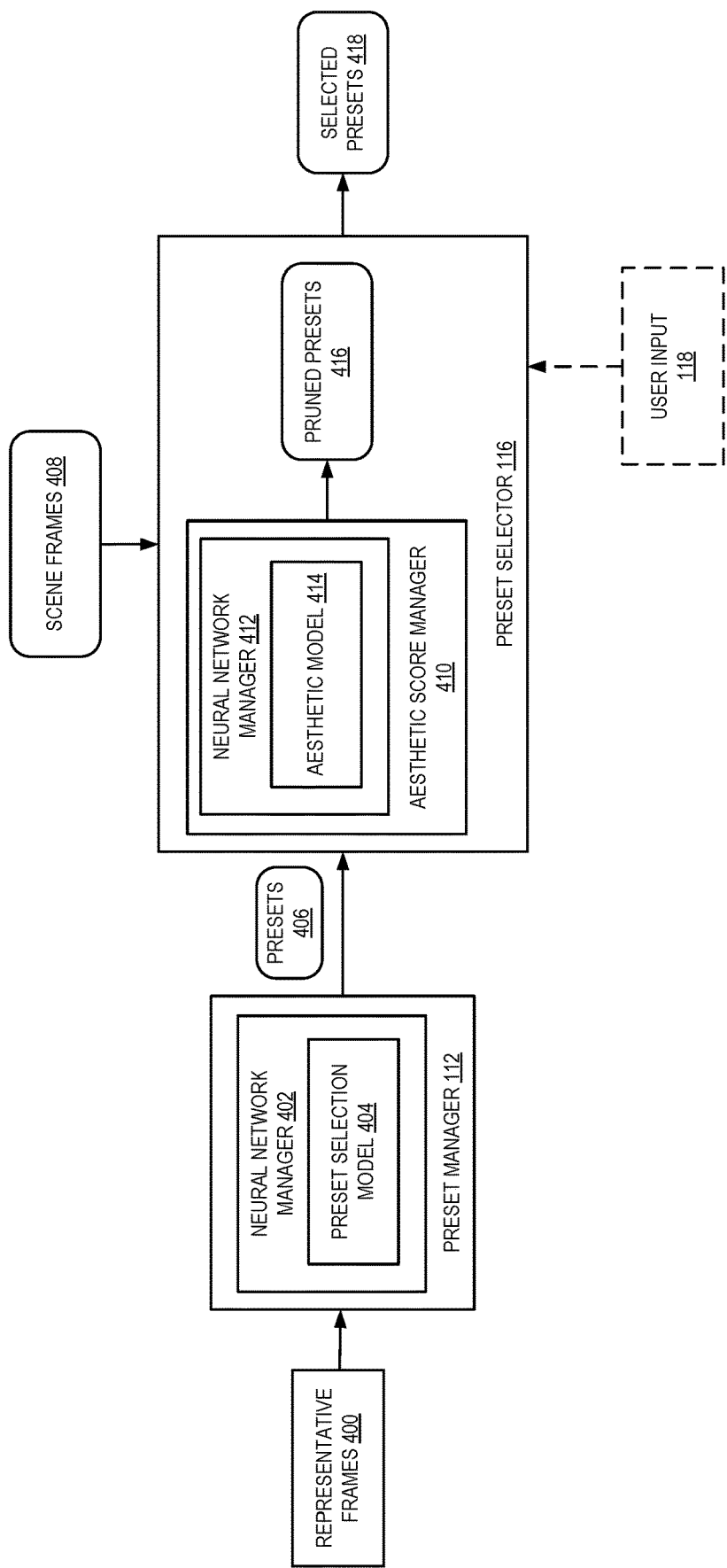
FIG. 4 illustrates a diagram of a process of determining editing settings per scene in accordance with one or more embodiments.

FIG. 4 illustrates a diagram of a process of determining editing settings per scene in accordance with one or more embodiments. Once representative frames 400 have been obtained for each scene of the input video, they are provided to preset manager 112. Preset manager 112 includes a preset selection model 404 which identifies a set of editing settings (e.g., a "preset") for an input frame. This allows for preset selection model 404 to identify a preset for each representative frame and provide these presets 406 to preset selector 116. In some embodiments, the preset manager 112 includes neural network manager 402. As discussed above, a neural network manager provides a hosting and/or execution environment for neural networks to operate in. In some embodiments, neural network manager 402 and neural network manager 302 are the same neural network manager which hosts, and facilitates the execution of, multiple neural networks. Alternatively, in some embodiments, multiple, separate, neural network manager instances are used to host and execute different neural networks.

The preset selection model 404 is trained to generate a content embedding based on the input image. These content embeddings are high dimensional vectors that represent the content of the images. Using the preset selection model 404, an embedding is generated for each representative frame and compared to the embeddings previously generated for the images in the library. The model matches the input image (e.g., representative frame) to one or more images from the library by comparing their respective embeddings. For example, in some embodiments, a distance metric is used to identify the closest images from the library to the input image within the embedding space. Once those images have been identified, presets associated with those images that have been previously determined to improve the quality of the images are then recommended for the input image.

Preset selector 116 receives the presets 406 and the scene frames 408. As discussed, the scene frames 408, in some embodiments, have been extracted from the original input video and provided as a separate file. Alternatively, the scene frames 408 include the entire input video and an editing file that indicates which frames from the input video are associated with which identified scenes. The presets 406 can include a large number of presets, not all of which improve the appearance of the scene equally. As such, the preset selector 116 is tasked with reducing the number of presets before they are presented to the user for selection. Alternatively, the preset selector 116 chooses the preset for each scene automatically, based on a ranking of the aesthetic improvements provided by each preset to each scene.

The preset selector 116 includes an aesthetic score manager 410 which determines an aesthetic score for each scene frame when the presets 406 are applied to them. In some embodiments, the aesthetic score manager 410 includes an aesthetic model 414. Similar to the preset selection model 404 and the frame selection model 304, a neural network manager 412 provides a hosting and/or execution environment for the aesthetic model 414. Likewise, in some embodiments, neural network manager 412, neural network manager 402, and neural network manager 302 are the same neural network manager which hosts, and facilitates the execution of, multiple neural networks. Alternatively, in some embodiments, multiple, separate, neural network manager instances are used to host and execute different neural networks.

The aesthetic model 414 is a neural network that acts as a recommendation engine and is trained using images from an image repository, such as a public or private image library. In some embodiments, the preset selector 116 uses the aesthetic model to compute an aesthetic score of each frame after applying a preset. For example, one such model is implemented as a convolutional neural network (CNN) which computes an aesthetics/quality score, along with ten aesthetics attributes (interesting content, object emphasis, lighting quality etc.) for any input image. In some embodiments, the aesthetic model includes a feature encoder which generates a feature vector for the input image. The feature encoder, in some embodiments, includes a separate network or is implemented as one or more layers of the CNN. The feature vector is then provided to one or more classifiers which are trained to evaluate the aesthetics of one or more attributes of the image. The output of each classifier is a numerical value indicating a score for the corresponding aesthetic attribute. In some embodiments, the outputs are combined into a single aesthetics/quality score for the image. Alternatively, in some embodiments, aesthetic models having different architectures are used. For example, in some embodiments, the aesthetic model is implemented as any machine learning model that receives an image as input and determines an aesthetics/quality score for the image. The aesthetic scores for each frame using each preset are computed using the aesthetic model.

The preset selector 114 then uses the aesthetic scores to compute an effectiveness score. This enables the preset selector to identify the presets that result in the highest aesthetic improvement across the frames of a scene. In some embodiments, the effectiveness score of a preset for a given frame represents the normalized difference in the aesthetics score of the frame computed before and after applying the preset.

$$ES_i = \frac{(AS_i^{After} - AS_i^{Before})}{AS_i^{Before}}$$

where $ES_i$ is the effectiveness score of a preset for the $i^{th}$ frame in a scene, $AS_i^{After}$ is the aesthetic score computed for the $i^{th}$ frame after the preset has been applied, and $AS_i^{Before}$ is the aesthetic score computed for the $i^{th}$ frame before the preset has been applied. Using the effectiveness scores for all of the frames of a scene using a given preset, an average effectiveness score $ES_{avg}$ is computed as:

$$ES_{avg} = \frac{1}{n}\sum_{i=0}^{n} ES_i$$

If the average effectiveness score for a preset is less than a specified threshold $ES_T$, then that preset is discarded the recommended preset list. This process is repeated for each preset until a pruned preset list 416 is generated. In some embodiments, the pruned preset list 416 is presented to a user via a user interface. The user can then select a preset for each scene through the user interface by providing one or more user inputs 118. Once selected, the selected presets 418 are then made available to the video editor 122, as discussed.

FIG. 5 illustrates an example of aesthetic scores for frames before and after editing settings have been applied, in accordance with one or more embodiments. As shown in FIG. 5, an aesthetic score is computed for the frames of a scene. As discussed, to determine the effectiveness of a given preset, the aesthetics of the frame before any edits have been applied is first determined. As shown at 500, a score is determined for each frame. In this instance, the aesthetic scores range from 74 to 77 before applying a preset to the video. As discussed, the same preset is applied to all of the frames of a scene. As such, at 502, the frames have had the same preset applied and aesthetic scores have been determined. In this example, the aesthetic scores now range, after the preset has been applied, between 77 and 80. Although only four frames of the scene are shown, this is for simplicity of depiction. Any given scene includes a plurality of frames. As discussed, with these scores determined for all of the frames of the scene, the average effectiveness score is determined for the preset for the scene. Once this is determined for all of the presets recommended for the scene, the list of presets is pruned such that the user is presented with a subset of presets that result in the highest aesthetic improvement.

Figure 6:
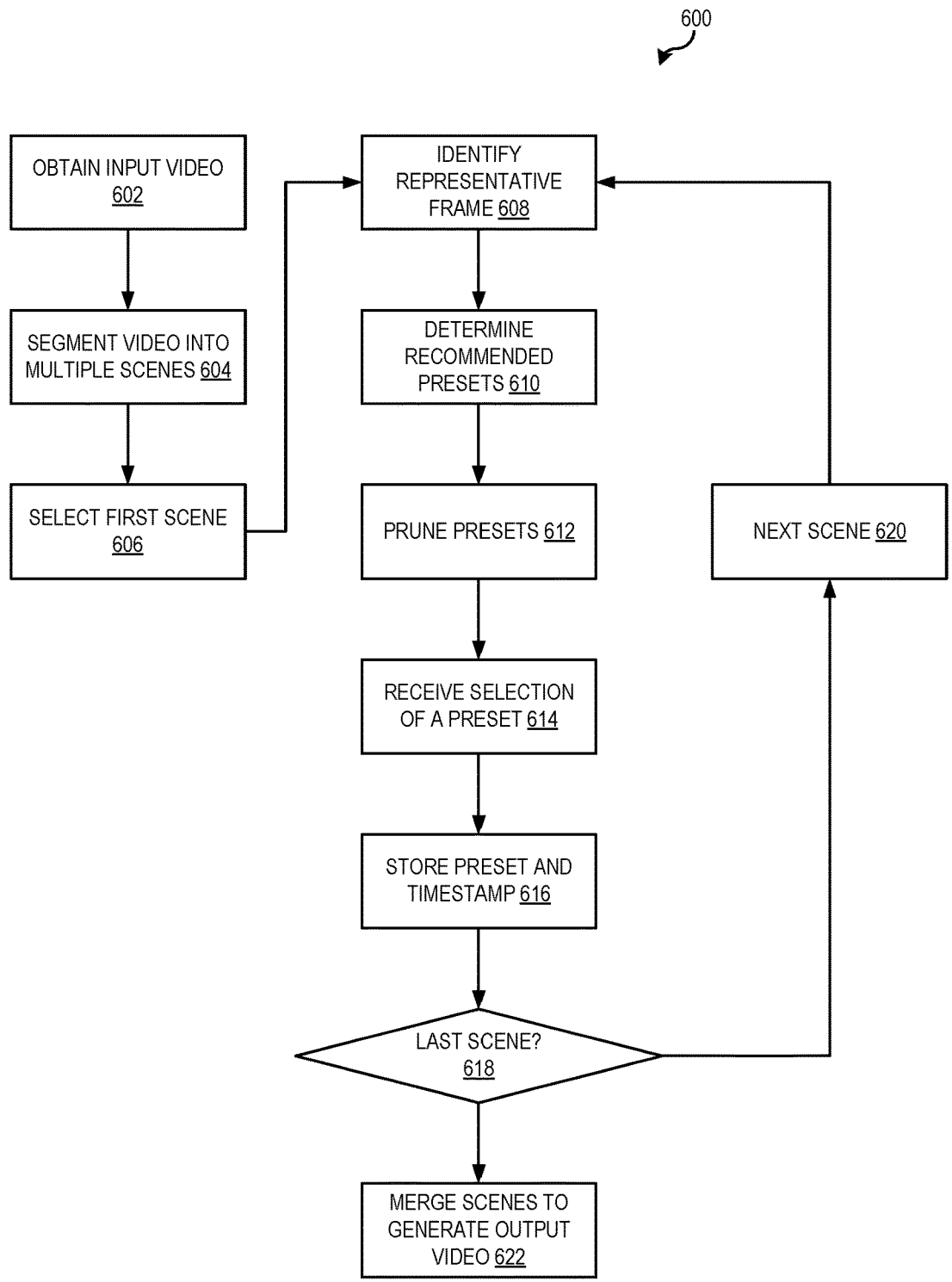
FIG. 6 illustrates a diagram of an example process of determining scene-based edit suggestions for scenes of a video in accordance with one or more embodiments.

FIG. 6 illustrates a diagram of an example process 600 of determining scene-based edit suggestions for scenes of a video in accordance with one or more embodiments. As shown in FIG. 6, an input video is obtained at 602. In some embodiments, the input video is provided by a user to the video editing recommendation system. For example, the user selects a locally stored video, a remotely stored video (e.g., in a storage service, networked storage device, etc.), captures and streams a video via a video capture device (e.g., a video camera), or otherwise makes the video available to the video editing recommendation system. At 604, the video editing recommendation system then segments the input video into multiple scenes. As discussed, in some embodiments, the scenes are divided based on the content of the frames of the video. For example, consecutive frames with similar color composition are determined to belong to the same scene. The scenes are identified by timestamp (e.g., the timestamps associated with a first and last frame of the scene), or other identifier.

At 606, a first scene of the input video is selected. As discussed, in some embodiments the scenes are extracted into separate files. Alternatively, each scene is processed individually using the scene timestamps. At 608 a representative frame of the scene is identified. As discussed, a first machine learning model is used to identify the frame from the frames of the scene. For example, a quality score is determined for each frame and the frame having the highest quality score is determined to be the representative frame. At 612, recommended presets are determined using the representative frame. As discussed, a second machine learning model is used to determine the recommended presets. For example, the second machine learning model identifies similar images from a library of images and provides presets associated with the similar images as recommended presets for the representative frame.

The recommended presets include some presets that produce a more aesthetically pleasing output than others. As a result, at 612, the recommended presets are pruned to a more manageable size based on the aesthetic improvements they provide to the scene. For example, a third machine learning model is used to determine an aesthetic score for each frame of the scene. The change in aesthetic scores is determined for each frame and averaged, resulting in an average effective score for the preset for a scene. This is determined for each preset recommended for the scene. The recommended presets are pruned based on the average effectiveness scores and then presented for selection. At 614, a preset is selected for the scene. For example, in some embodiments, the presets are presented to the user via a user interface and the user then chooses which preset they prefer. Alternatively, a different service or system selects a preset from the pruned preset list. In some embodiments, at 616, the timestamps of the scene and the preset are stored.

At 618, it is determined whether there are additional scenes in the input video. For example, a timestamp of the current scene being processed is compared to the end time of the input video. Alternatively, the number of scenes that were identified at 604 is stored and used to determine whether additional scenes remain to be processed. If there are additional scenes, then at 620 the next scene is retrieved, and processing returns to 608. If there are no additional scenes to be processed, then the scenes are edited using their respective presets and the edited scenes are merged to generate the output video at 622.

FIG. 7 illustrates an example of a scene-based editing data structure 700, in accordance with one or more embodiments. As discussed, in some embodiments, scene-based editing recommendations are stored as editing data which is then used to apply the scene-specific edits to each scene. In some embodiments, the editing data is metadata which is represented using various data formats, such as JSON, XML, XMP, etc. As shown in FIG. 7, the scene-based editing data structure includes scene information like start timestamp 702, 708 and end timestamp 704, 710. In some embodiments, additional information, such as an optional scene name, is included. For a given scene, the editing settings 706, 712 applicable to that scene are included. In some embodiments, the scene-based editing data is added to a metadata structure associated with the video. In such instances, a field named "SceneCorrections" is added which includes a list of scenes and their corresponding editing settings 706, 712.

Figure 8:
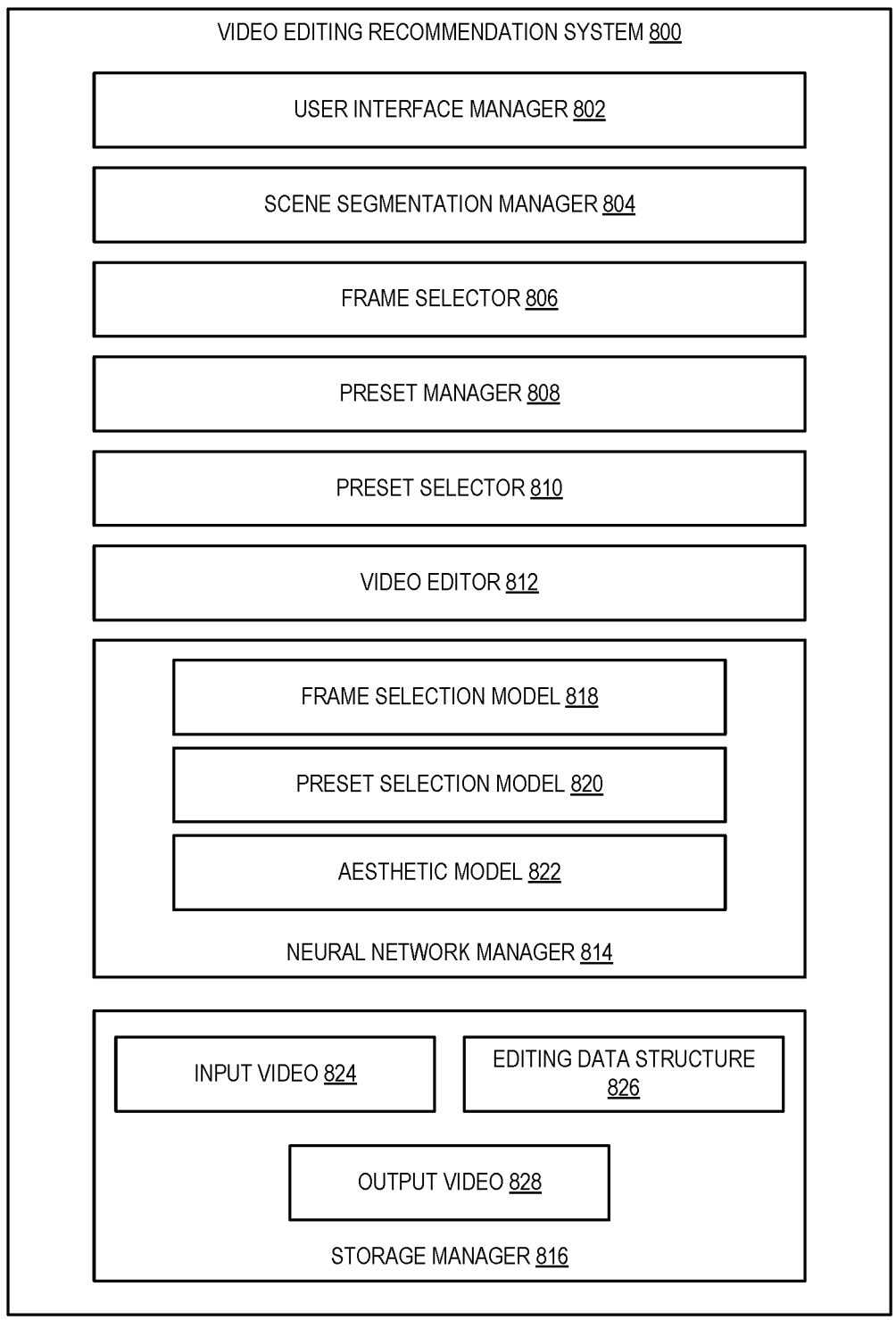
FIG. 8 illustrates a schematic diagram of a video editing recommendation system in accordance with one or more embodiments.

FIG. 8 illustrates a schematic diagram of video editing recommendation system (e.g., "video editing recommendation system" described above) in accordance with one or more embodiments. As shown, the video editing recommendation system 800 may include, but is not limited to, user interface manager 802, scene segmentation manager 804, frame selector 806, preset manager 808, preset selector 810, video editor 812, neural network manager 814, and storage manager 816. The neural network manager 814 includes a frame selection model 818, a preset selection model 820, and an aesthetic model 822. The storage manager 816 includes input video 824, editing data structure 826, and output video 828.

As illustrated in FIG. 8, the video editing recommendation system 800 includes a user interface manager 802. For example, the user interface manager 802 allows users to provide input video 824 to the video editing recommendation system 800. In some embodiments, the user interface manager 802 provides a user interface through which the user uploads the input video 824, selects presets to edit each scene, etc., as discussed above. Alternatively, or additionally, the user interface enables the user to download the video from a local or remote storage location (e.g., by providing an address, such as a URL or other endpoint, associated with a video source, storage service, etc.). In some embodiments, the user interface enables a user to link a video capture device, such as a camera or other hardware, to capture video data and provide it to the video editing recommendation system 800.

Additionally, the user interface manager 802 allows users to request the video editing recommendation system 800 to provide scene-based edit recommendations for the input video. In some embodiments, the user interface manager 802 enables the user to view the resulting output video and/or request further edits to the video.

As illustrated in FIG. 8, the video editing recommendation system 800 includes a scene segmentation manager 804. As discussed, scene segmentation manager 804 receives the input video 824 and divides it into multiple scenes. The scene segmentation manager 804 implements one of various scene segmentation algorithms to divide the scenes based on their content. For example, in some embodiments, the scene segmentation manager implements a histogram differences technique which identifies a new scene when a frame has a sufficiently different color composition from a previous frame. Once the scenes have been identified, the scenes are passed to frame selector 806 to identify a representative frame.

As illustrated in FIG. 8, the video editing recommendation system 800 includes a frame selector 806. As discussed, frame selector 806 receives scenes of the input video 824 from scene segmentation manager 804. In some embodiments, the frame selector 806 receives separate files (e.g., where the individual scenes have been extracted and stored as separate video files). Alternatively, frame selector 806 receives timestamps associated with at least when each scene starts in the input video (e.g., the start frame of each scene or the start and end frames of each scene). The frame selector 806 then uses frame selection model 818 to identify a representative frame for the scene. As discussed, the frame selection model 818 is a neural network trained to determine a quality score for each frame it is provided. After processing each frame of a scene, and determining their corresponding quality scores, the frame with the highest quality score is determined to be the representative frame. This continues until representative frames have been identified for each scene.

As illustrated in FIG. 8, the video editing recommendation system 800 includes a preset manager 808. Preset manager 808 receives the representative frames from frame selector 806. Each representative frame is then input to preset selection model 820. As discussed, preset selection model generates a content embedding which is used to identify similar images from an image library to the representative image. Recommended presets (e.g., editing settings associated with the similar images) are then identified and provided to preset selector 810.

As illustrated in FIG. 8, the video editing recommendation system 800 includes a preset selector 810. Although multiple presets are found for a given representative frame, not all of the presets perform equally, and presenting a potentially large number of preset options that do not improve the appearance of the scene provides a generally negative user experience. As such, the preset selector 810 is responsible for pruning the recommended presets based on their performance. As discussed, the preset selector uses aesthetic model 822 to calculate an average effectiveness score for each preset for a given scene. The presets with an average effectiveness score lower than a threshold value are discarded from the recommended presets. The resulting pruned list of recommended presets is then presented to the user for selection of the preset to be used for each scene.

As illustrated in FIG. 8, the video editing recommendation system 800 includes a video editor 812. The video editor 812 facilitates the generation, modification, accessing, storing, and/or deletion of digital video content. As discussed, in some embodiments, the video editor 812 edits each scene of the input video using the selected presets. As discussed, the selected presets include settings for exposure, contrast, white balance, highlights, clarity, etc. which are then applied to each scene using the timestamps identified above. In some embodiments, the video editor 812 blends between scenes. As discussed, different scenes have different presets applied to them during editing. This can lead to the appearance of hard cuts between successive scenes. Accordingly, in some embodiments, transition frames between scenes are identified. Such transition frames are identified using techniques such as histogram differences, as discussed above. Alternatively, the transition frames include a number of frames before and after the first frame of the next scene. For example, in one implementation, five to ten frames on either side of the scene are identified as transition frames. In some embodiments, the number of transition frames is a parameter that is set by the user. For the transition frames, blended edits are made to make a smoother transition across scenes. For example, given two scenes with a gradual transition where scene 1 has an exposure value of +1.0 and scene 2 has an exposure value of +2.0, the video editor interpolates between the start (e.g., +1.0) and end (e.g., +2.0) exposure values over the transition frames, so that the scene change in the merged video does not appear abrupt. The edited video is then provided as output video 828.

As illustrated in FIG. 8, the video editing recommendation system 800 also includes a neural network manager 814. Neural network manager 814 hosts a plurality of neural networks or other machine learning models, such as frame selection model 818, preset selection model 820, and aesthetic model 822. The neural network manager 814 includes an execution environment, libraries, and/or any other data needed to execute the machine learning models. In some embodiments, the neural network manager 814 is associated with dedicated software and/or hardware resources to execute the machine learning models. Although depicted in FIG. 8 as being hosted by a single neural network manager 814, in various embodiments the neural networks are hosted in multiple neural network managers and/or as part of different components. For example, in some embodiments, each model 818-822 is hosted by their own neural network manager, or other host environment, in which the respective neural networks execute, or the models are spread across multiple neural network managers depending on, e.g., the resource requirements of each model, etc.

As illustrated in FIG. 8, the video editing recommendation system 800 also includes the storage manager 816. The storage manager 816 maintains data for the video editing recommendation system 800. The storage manager 816 maintains data of any type, size, or kind as necessary to perform the functions of the video editing recommendation system 800. The storage manager 816, as shown in FIG. 8, includes the input video 824. The input video 824 includes any digital video file that includes a video with multiple scenes, as discussed in additional detail above. As discussed, the input video 824 is obtained from a local or remote data store or any location accessible to the video editing recommendation system.

As further illustrated in FIG. 8, the storage manager 816 also includes editing data structure 826. As discussed above, editing data structure 826 includes details for how the input video 824 is to be edited to generate output video 828. For example, the editing data structure includes at least the presets selected by the user to be used for each scene, as well as timestamps defining each scene in the input video 824, as discussed above. The storage manager 816 also includes output video 828. Output video 828 is a copy of the input video 824 after editing has been performed using the selected per-scene presets. In some embodiments, once edited, the input video 824 is replaced by the output video 828. Alternatively, a copy of the input video 824 is made for editing. This allows for the user to edit the input video without risking losing the input video 824 should the edits need to be reverted, new edits applied, etc.

Each of the components 802-816 of the video editing recommendation system 800 and their corresponding elements (as shown in FIG. 8) may be in communication with one another using any suitable communication technologies. It will be recognized that although components 802-816 and their corresponding elements are shown to be separate in FIG. 8, any of components 802-816 and their corresponding elements may be combined into fewer components, such as into a single facility or module, divided into more components, or configured into different components as may serve a particular embodiment.

The components 802-816 and their corresponding elements can comprise software, hardware, or both. For example, the components 802-816 and their corresponding elements can comprise one or more instructions stored on a computer-readable storage medium and executable by processors of one or more computing devices. When executed by the one or more processors, the computer-executable instructions of the video editing recommendation system 800 can cause a client device and/or a server device to perform the methods described herein. Alternatively, the components 802-816 and their corresponding elements can comprise hardware, such as a special purpose processing device to perform a certain function or group of functions. Additionally, the components 802-816 and their corresponding elements can comprise a combination of computer-executable instructions and hardware.

Furthermore, the components 802-816 of the video editing recommendation system 800 may, for example, be implemented as one or more stand-alone applications, as one or more modules of an application, as one or more plug-ins, as one or more library functions or functions that may be called by other applications, and/or as a cloud-computing model. Thus, the components 802-816 of the video editing recommendation system 800 may be implemented as a stand-alone application, such as a desktop or mobile application. Furthermore, the components 802-816 of the video editing recommendation system 800 may be implemented as one or more web-based applications hosted on a remote server. Alternatively, or additionally, the components of the video editing recommendation system 800 may be implemented in a suit of mobile device applications or "apps."

Figure 9:
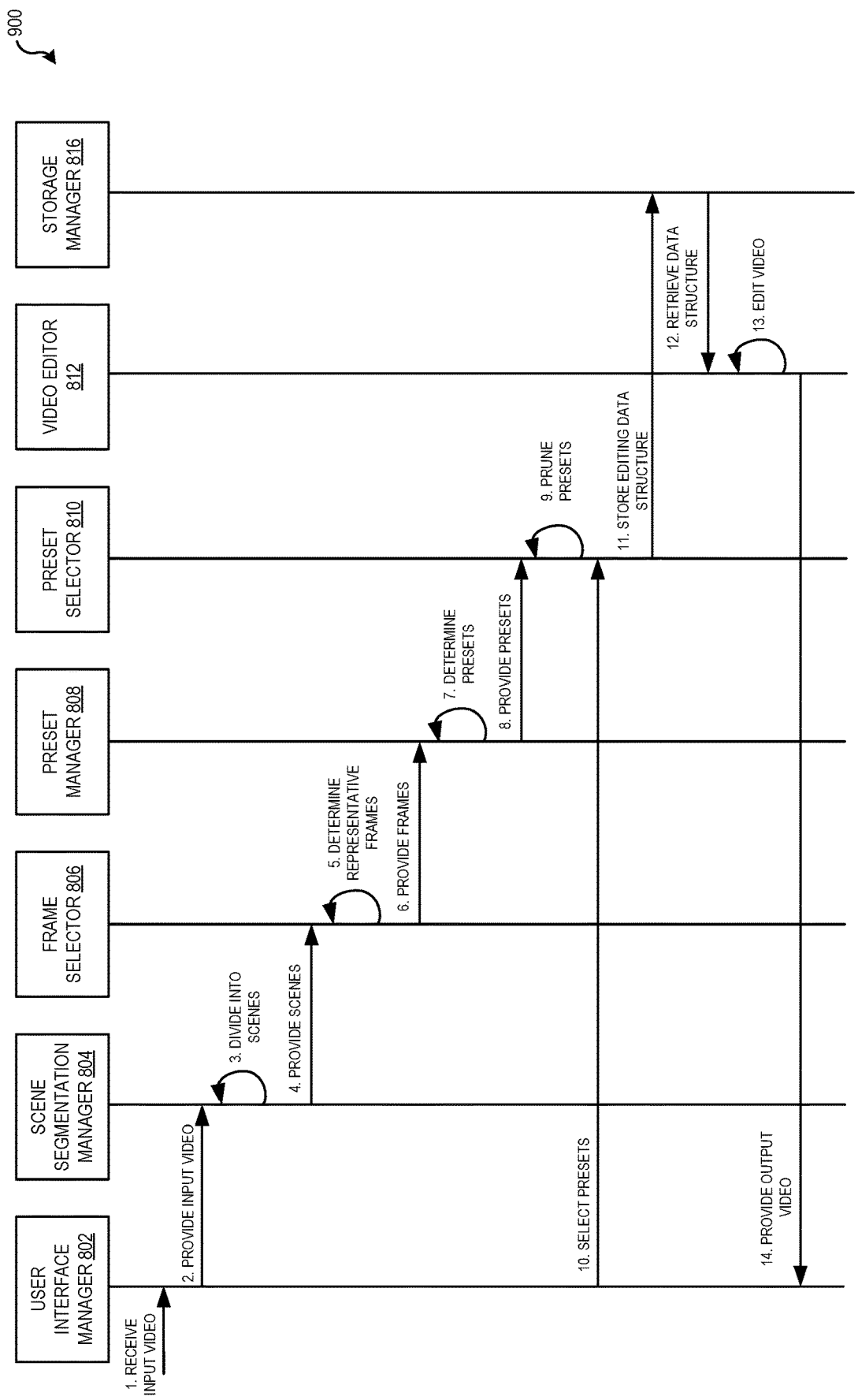
FIG. 9 illustrates a sequence diagram of a video editing system in accordance with one or more embodiments.

FIG. 9 illustrates a sequence diagram of a video editing system in accordance with one or more embodiments. As shown in FIG. 9, a user provides an input video using user interface manager 802 at numeral 1. In some embodiments, the user selects the input video using user interface manager 802 to navigate a local or remote file system, access a storage service where the video is stored, etc. At numeral 2, the input video is provided to scene segmentation manager 804. For example, the user selects a user interface element associated with scene-based edit recommendations and identifies the input video to start the editing process.

At numeral 3, the scene segmentation manager 804 divides the input video into scenes. As discussed, the scene segmentation manager 804 implements one or more scene identification techniques to identify different scenes in the input video automatically, based on the content of the video. For example, one such technique, histogram differences, identifies the frames of scenes based on their color composition relative to the frames of other scenes. Once the scenes have been identified, the scenes are provided to the frame selector 806 at numeral 4. As discussed, the scenes can be extracted into separate files, or the timestamps associated with the scenes can be identified.

At numeral 5, the frame selector 806 determines a representative frame for each scene. As discussed, the frame selector 806 uses a frame selection model trained to identify a representative frame from among multiple frames. Once a representative frame of each scene has been determined, the frames are provided to the preset manager 808 at numeral 6. At numeral 7, the preset manager 808 uses a preset recommendation model to identify recommended presets (e.g., editing settings) to be applied to the representative frames. The presets are then provided to the preset selector 810 at numeral 8.

At numeral 9, the preset selector prunes the presets. For example, the preset selector uses an aesthetic model to determine an aesthetic score for the frames of a scene before the scene has been edited using a preset and after the scene has been edited. Using the aesthetic scores, an average effectiveness score is calculated for each scene for each preset. Presets having an average effectiveness score below a threshold are pruned. Once the preset list has been pruned, at numeral 10 the user selects a preset to be used for each scene. The selected presets, scene data, etc. are stored in an editing data structure at numeral 11. At numeral 12, the video editor obtains the editing data structure and, at numeral 13, edits each scene using the scene-specific presets defined by the editing data structure. Once completed, the edited output video is returned at numeral 14. For example, the output video can be shown in a user interface, via user interface manager 802, to the user for review.

Figure 10:
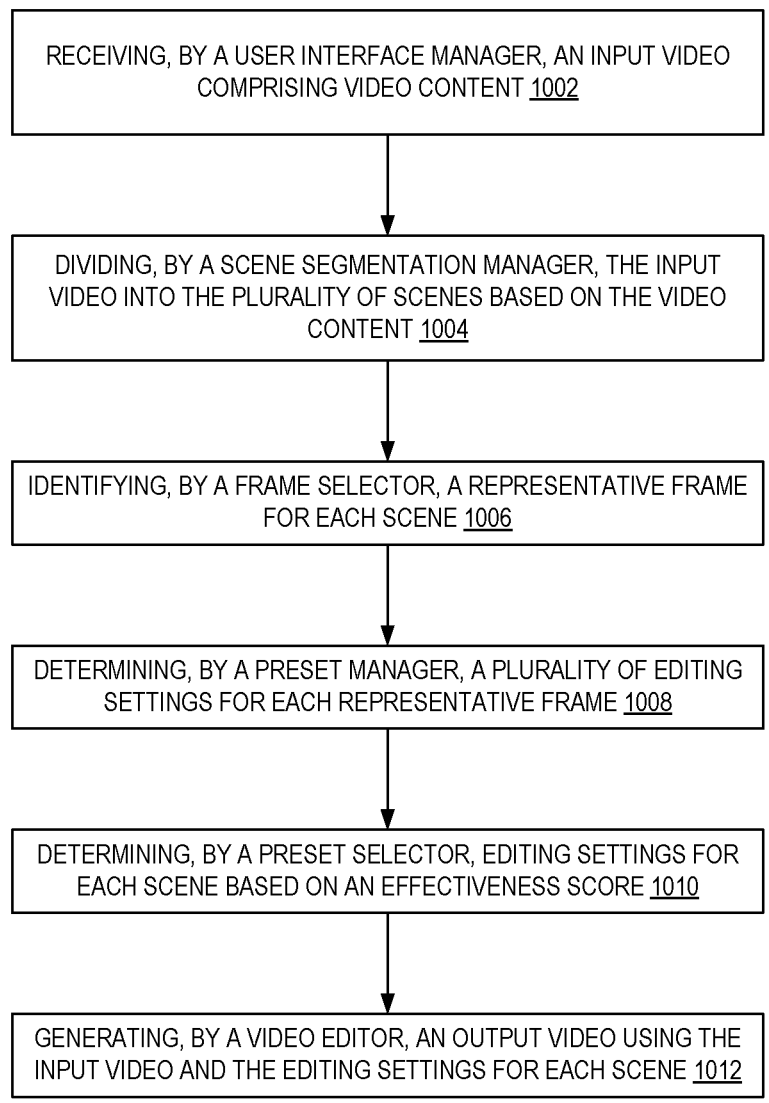
FIG. 10 illustrates a flowchart of a series of acts in a method of determining scene-based edit suggestions for video data in accordance with one or more embodiments.

FIGS. 1-9, the corresponding text, and the examples, provide a number of different systems and devices that provide scene-based edit recommendations for videos. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of determining scene-based edit suggestions for video data in accordance with one or more embodiments. In one or more embodiments, the method 1000 is performed in a digital medium environment that includes the video editing recommendation system 800. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving, by a user interface manager, an input video comprising video content. As discussed, the user provides the input video, such as by opening the video from a local or remote storage location, providing access to the video stored in a storage service, or otherwise identifies the video in a location accessible to the video editing recommendation system.

As illustrated in FIG. 10, the method 1000 includes an act 1004 of dividing, by a scene segmentation manager, the input video into a plurality of scenes based on the video content. As discussed, various techniques may be used to automatically identify different scenes in the input video. In some embodiments, dividing the video content into scenes includes using histogram difference to identify the plurality of scenes, wherein a new scene is identified when the histogram difference of consecutive frames of the video content is higher than a threshold value.

As illustrated in FIG. 10, the method 1000 includes an act 1006 of identifying, by a frame selector, a representative frame for each scene. In some embodiments, a first machine learning model identifies, for each scene, the representative frame. For example, in some embodiments, identifying the representative frame includes providing a plurality of frames associated with a scene to a frame selection model, wherein the frame selection model determines a quality score for each frame of the plurality of frames, and selecting a frame having a highest quality score as the representative frame for the scene.

As illustrated in FIG. 10, the method 1000 includes an act 1008 of determining, by a preset manager, a plurality of editing settings for each representative frame. The presets for each scene are determined based on the representative frames. In some embodiments, determining the editing settings includes providing the representative frame for each scene to a preset selection model, wherein the preset selection model determines a content embedding for each representative frame and identifies similar images from an image library using the content embedding, and identifying editing settings associated with each similar image to determine the plurality of editing settings.

As illustrated in FIG. 10, the method 1000 includes an act 1010 of determining, by a preset selector, editing settings for each scene based on an effectiveness score. As discussed, a large number of presets are identified for each scene using the representative frame. Some of these presets perform better at improving the aesthetics of the scene than others. Accordingly, before they are presented to the user, the presets are first pruned based on which perform best. In some embodiments, determining the editing settings includes determining, by the preset selector, a first aesthetic score for each frame of a first scene using an aesthetic model, wherein the aesthetic model receives each frame and outputs the first aesthetic score associated with each frame. In some embodiments, determining the editing settings includes applying a first editing setting to a first scene to create an edited first scene, determining a second aesthetic score for each frame of the edited first scene using the aesthetic model, and calculating an average effectiveness score for the first scene based on a change in aesthetic scores between the first aesthetic score and the second aesthetic score.

As illustrated in FIG. 10, the method 1000 includes an act 1012 of generating, by a video editor, an output video using the input video and the editing settings for each scene. In some embodiments, the selected presets and the scene information (e.g., timestamps, etc.) are added to an editing data structure, such as a metadata file, which is used by the video editor to apply the selected presets to their associated scenes. In some embodiments, generating the output video includes receiving a selection of an editing setting for each scene of the video content, and applying the selected editing setting to each scene to generate the output video. Additionally, in some embodiments, the edits are blended between scenes, to reduce any visible artifacts associated with different scenes having different editing settings. In such embodiments, generating the output video further includes identifying a plurality of transition frames between a first scene and a second scene in the video content, determining blended editing settings based on first editing settings associated with the first scene and second editing settings associated with the second editing scene, and applying the blended editing settings to the transition frames.

Figure 11:
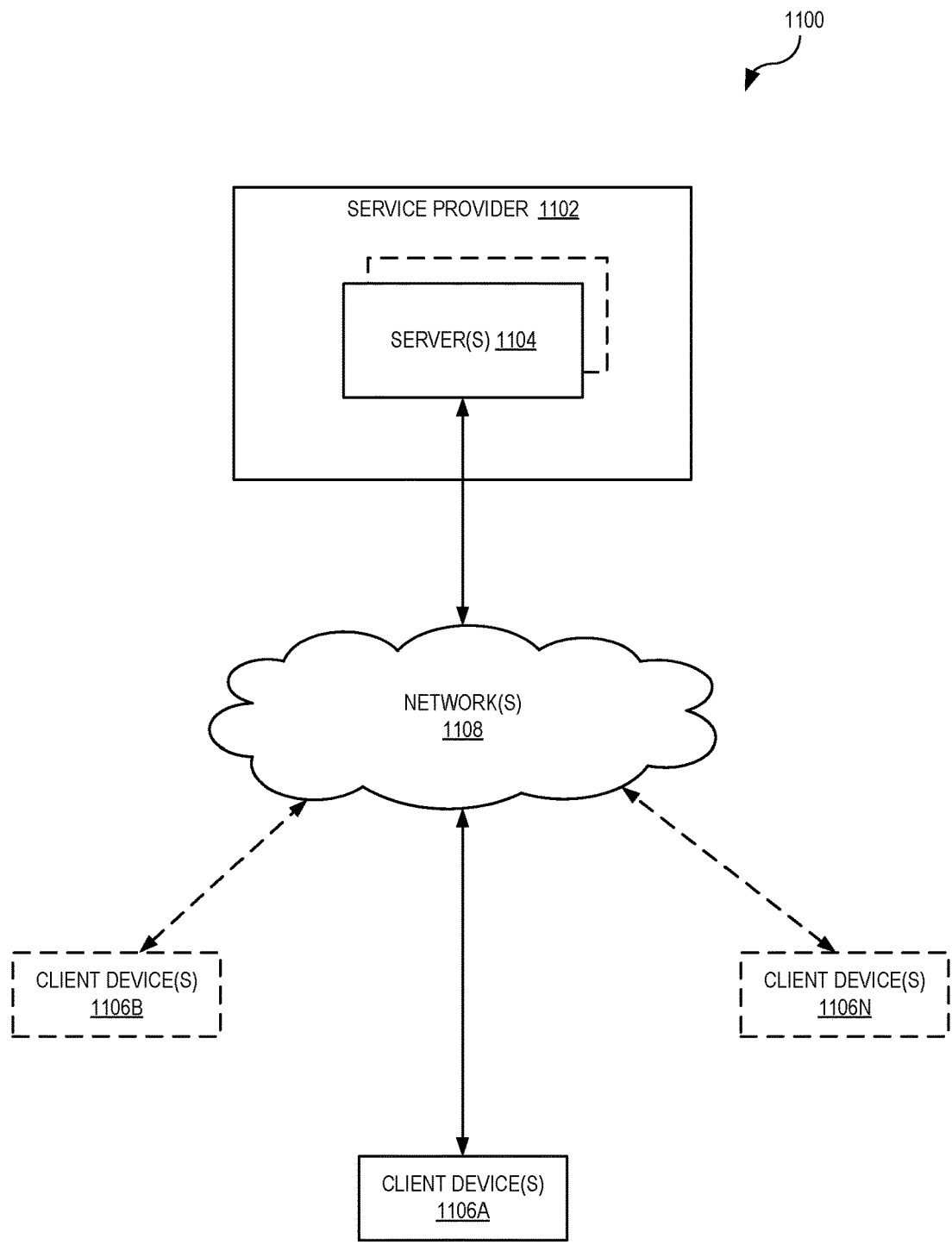
FIG. 11 illustrates a schematic diagram of an exemplary environment in which the video editing system can operate in accordance with one or more embodiments.

FIG. 11 illustrates a schematic diagram of an exemplary environment 1100 in which the video editing recommendation system 800 can operate in accordance with one or more embodiments. In one or more embodiments, the environment 1100 includes a service provider 1102 which may include one or more servers 1104 connected to a plurality of client devices 1106A-1106N via one or more networks 1108. The client devices 1106A-1106N, the one or more networks 1108, the service provider 1102, and the one or more servers 1104 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 11 illustrates a particular arrangement of the client devices 1106A-1106N, the one or more networks 1108, the service provider 1102, and the one or more servers 1104, various additional arrangements are possible. For example, the client devices 1106A-1106N may directly communicate with the one or more servers 1104, bypassing the network 1108. Or alternatively, the client devices 1106A-1106N may directly communicate with each other. The service provider 1102 may be a public cloud service provider which owns and operates their own infrastructure in one or more data centers and provides this infrastructure to customers and end users on demand to host applications on the one or more servers 1104. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1104. In some embodiments, the service provider may be a private cloud provider which maintains cloud infrastructure for a single organization. The one or more servers 1104 may similarly include one or more hardware servers, each with its own computing resources, which are divided among applications hosted by the one or more servers for use by members of the organization or their customers.

Similarly, although the environment 1100 of FIG. 11 is depicted as having various components, the environment 1100 may have additional or alternative components. For example, the environment 1100 can be implemented on a single computing device with the video editing recommendation system 800. In particular, the video editing recommendation system 800 may be implemented in whole or in part on the client device 1102A.

As illustrated in FIG. 11, the environment 1100 may include client devices 1106A-1106N. The client devices 1106A-1106N may comprise any computing device. For example, client devices 1106A-1106N may comprise one or more personal computers, laptop computers, mobile devices, mobile phones, tablets, special purpose computers, TVs, or other computing devices, including computing devices described below with regard to FIG. 12. Although three client devices are shown in FIG. 11, it will be appreciated that client devices 1106A-1106N may comprise any number of client devices (greater or smaller than shown).

Moreover, as illustrated in FIG. 11, the client devices 1106A-1106N and the one or more servers 1104 may communicate via one or more networks 1108. The one or more networks 1108 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1108 may be any suitable network over which the client devices 1106A-1106N may access service provider 1102 and server 1104, or vice versa. The one or more networks 1108 will be discussed in more detail below with regard to FIG. 12.

In addition, the environment 1100 may also include one or more servers 1104. The one or more servers 1104 may generate, store, receive, and transmit any type of data, including input video 824, editing data structure 826, and output video 828, or other information. For example, a server 1104 may receive data from a client device, such as the client device 1106A, and send the data to another client device, such as the client device 1102B and/or 1102N. The server 1104 can also transmit electronic messages between one or more users of the environment 1100. In one example embodiment, the server 1104 is a data server. The server 1104 can also comprise a communication server or a web-hosting server. Additional details regarding the server 1104 will be discussed below with respect to FIG. 12.

As mentioned, in one or more embodiments, the one or more servers 1104 can include or implement at least a portion of the video editing recommendation system 800. In particular, the video editing recommendation system 800 can comprise an application running on the one or more servers 1104 or a portion of the video editing recommendation system 800 can be downloaded from the one or more servers 1104. For example, the video editing recommendation system 800 can include a web hosting application that allows the client devices 1106A-1106N to interact with content hosted at the one or more servers 1104. To illustrate, in one or more embodiments of the environment 1100, one or more client devices 1106A-1106N can access a webpage supported by the one or more servers 1104. In particular, the client device 1106A can run a web application (e.g., a web browser) to allow a user to access, view, and/or interact with a webpage or website hosted at the one or more servers 1104.

Upon the client device 1106A accessing a webpage or other web application hosted at the one or more servers 1104, in one or more embodiments, the one or more servers 1104 can provide access to one or more digital videos (e.g., the input video data 824) stored at the one or more servers 1104. Moreover, the client device 1106A can receive a request (i.e., via user input) to determine scene-based editing recommendations and provide the request to the one or more servers 1104. Upon receiving the request, the one or more servers 1104 can automatically perform the methods and processes described above to identify editing recommendations for the scenes of the input video and edit the video accordingly to generate an output video. The one or more servers 1104 can provide the output video to the client device 1106A for display to the user.

As just described, the video editing recommendation system 800 may be implemented in whole, or in part, by the individual elements 1102-1108 of the environment 1100. It will be appreciated that although certain components of the video editing recommendation system 800 are described in the previous examples with regard to particular elements of the environment 1100, various alternative implementations are possible. For instance, in one or more embodiments, the video editing recommendation system 800 is implemented on any of the client devices 1106A-N. Similarly, in one or more embodiments, the video editing recommendation system 800 may be implemented on the one or more servers 1104. Moreover, different components and functions of the video editing recommendation system 800 may be implemented separately among client devices 1106A-1106N, the one or more servers 1104, and the network 1108.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
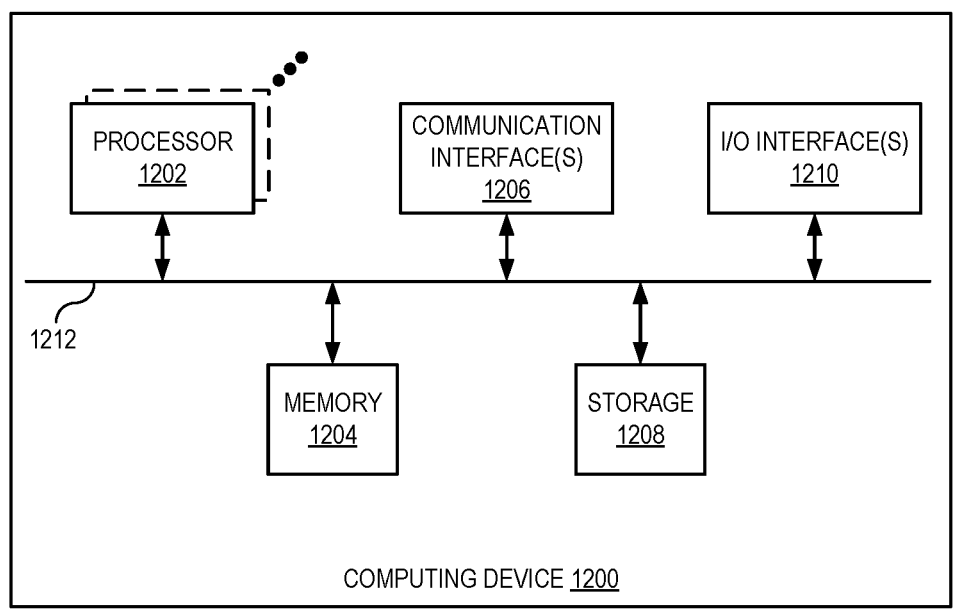
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that one or more computing devices such as the computing device 1200 may implement the video editing recommendation system. As shown by FIG. 12, the computing device can comprise a processor 1202, memory 1204, one or more communication interfaces 1206, a storage device 1208, and one or more I/O devices/interfaces 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example, and not by way of limitation, to execute instructions, processor(s) 1202 may retrieve (or fetch) the instructions from an internal register, an internal cache, memory 1204, or a storage device 1208 and decode and execute them. In various embodiments, the processor(s) 1202 may include one or more central processing units (CPUs), graphics processing units (GPUs), field programmable gate arrays (FPGAs), systems on chip (SoC), or other processor(s) or combinations of processors.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 can further include one or more communication interfaces 1206. A communication interface 1206 can include hardware, software, or both. The communication interface 1206 can provide one or more interfaces for communication (such as, for example, packet-based communication) between the computing device and one or more other computing devices 1200 or one or more networks. As an example and not by way of limitation, communication interface 1206 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

The computing device 1200 includes a storage device 1208 includes storage for storing data or instructions. As an example, and not by way of limitation, storage device 1208 can comprise a non-transitory storage medium described above. The storage device 1208 may include a hard disk drive (HDD), flash memory, a Universal Serial Bus (USB) drive or a combination these or other storage devices. The computing device 1200 also includes one or more input or output ("I/O") devices/interfaces 1210, which are provided to allow a user to provide input to (such as user strokes), receive output from, and otherwise transfer data to and from the computing device 1200. These I/O devices/interfaces 1210 may include a mouse, keypad or a keyboard, a touch screen, camera, optical scanner, network interface, modem, other known I/O devices or a combination of such I/O devices/interfaces 1210. The touch screen may be activated with a stylus or a finger.

The I/O devices/interfaces 1210 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1210 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
   receiving, by a user interface manager, an input video comprising video content;
   dividing, by a scene segmentation manager, the input video into a plurality of scenes based on the video content;
   identifying, by a frame selector, a representative frame for each scene;
   determining, by a preset manager, a plurality of editing settings for each representative frame;
   determining, by a preset selector, editing settings for each scene based on an effectiveness score; and
   generating, by a video editor, an output video using the input video and the editing settings for each scene.

2. The method of claim 1, wherein dividing, by a scene segmentation manager, the input video into the plurality of scenes based on the video content, further comprises:
   using histogram difference to identify the plurality of scenes, wherein a new scene is identified when the histogram difference of consecutive frames of the video content is higher than a threshold value.

3. The method of claim 1, wherein identifying, by a frame selector, a representative frame for each scene, further comprises:
   providing a plurality of frames associated with a scene to a frame selection model, wherein the frame selection model determines a quality score for each frame of the plurality of frames; and
   selecting a frame having a highest quality score as the representative frame for the scene.

4. The method of claim 1, wherein determining, by a preset manager, a plurality of editing settings for each representative frame, further comprises:
   providing the representative frame for each scene to a preset selection model, wherein the preset selection model determines a content embedding for each representative frame and identifies similar images from an image library using the content embedding; and
   identifying editing settings associated with each similar image to determine the plurality of editing settings.

5. The method of claim 1, further comprising:
   determining, by the preset selector, a first aesthetic score for each frame of a first scene using an aesthetic model, wherein the aesthetic model receives each frame and outputs the first aesthetic score associated with each frame.

6. The method of claim 5, wherein determining, by a preset selector, editing settings for each scene based on an effectiveness score, further comprises:
   applying a first editing setting to a first scene to create an edited first scene;
   determining a second aesthetic score for each frame of the edited first scene using the aesthetic model; and
   calculating an average effectiveness score for the first scene based on a change in aesthetic scores between the first aesthetic score and the second aesthetic score.

7. The method of claim 1, wherein generating, by a video editor, an output video using the input video and the editing settings for each scene, further comprises:
   receiving a selection of an editing setting for each scene of the video content; and
   applying the selected editing setting to each scene to generate the output video.

8. The method of claim 7, further comprising:
   identifying a plurality of transition frames between a first scene and a second scene in the video content;
   determining blended editing settings based on first editing settings associated with the first scene and second editing settings associated with the second scene; and applying the blended editing settings to the transition frames.

9. A system comprising:
a user interface manager to receive an input video comprising video content;
a scene segmentation manager to divide the input video into a plurality of scenes based on the video content;
a frame selector to identify a representative frame for each scene;
a preset manager to determine a plurality of editing settings for each representative frame;
a preset selector to determine editing settings for each scene based on an effectiveness score; and
a video editor to generate an output video using the input video and the editing settings for each scene.

10. The system of claim 9, wherein to divide the input video into the plurality of scenes based on the video content, the scene segmentation manager is further to:
use histogram difference to identify the plurality of scenes, wherein a new scene is identified when the histogram difference of consecutive frames of the video content is higher than a threshold value.

11. The system of claim 9, wherein to identify a representative frame for each scene, the frame selector is further to:
provide a plurality of frames associated with a scene to a frame selection model, wherein the frame selection model determines a quality score for each frame of the plurality of frames; and
select a frame having a highest quality score as the representative frame for the scene.

12. The system of claim 9, wherein to determine a plurality of editing settings for each representative frame, the preset manager is further to:
provide the representative frame for each scene to a preset selection model, wherein the preset selection model determines a content embedding for each representative frame and identifies similar images from an image library using the content embedding; and
identify editing settings associated with each similar image to determine the plurality of editing settings.

13. The system of claim 9, wherein the preset selector is further to:
determine a first aesthetic score for each frame of a first scene using an aesthetic model, wherein the aesthetic model receives each frame and outputs the first aesthetic score associated with each frame.

14. The system of claim 13, wherein to determine editing settings for each scene based on an effectiveness score, the preset selector is further to:
apply a first editing setting to a first scene to create an edited first scene;
determine a second aesthetic score for each frame of the edited first scene using the aesthetic model; and
calculate an average effectiveness score for the first scene based on a change in aesthetic scores between the first aesthetic score and the second aesthetic score.

15. The system of claim 9, wherein to generate an output video using the input video and the editing settings for each scene, the video editor is further to:
receive a selection of an editing setting for each scene of the video content; and
apply the selected editing setting to each scene to generate the output video.

16. The system of claim 15, wherein the video editor is further to:
identify a plurality of transition frames between a first scene and a second scene in the video content;
determine blended editing settings based on first editing settings associated with the first scene and second editing settings associated with the second scene; and
apply the blended editing settings to the transition frames.

17. A system comprising:
means for receiving an input video comprising video content;
means for dividing the input video into a plurality of scenes based on the video content;
means for identifying a representative frame for each scene;
means for determining a plurality of editing settings for each representative frame;
means for determining editing settings for each scene based on an effectiveness score; and
means for generating an output video using the input video and the editing settings for each scene.

18. The system of claim 17, wherein the means for dividing the input video into the plurality of scenes based on the video content further comprises:
means for using histogram difference to identify the plurality of scenes, wherein a new scene is identified when the histogram difference of consecutive frames of the video content is higher than a threshold value.

19. The system of claim 17, wherein the means for identifying a representative frame for each scene, further comprises:
means for providing a plurality of frames associated with a scene to a frame selection model, wherein the frame selection model determines a quality score for each frame of the plurality of frames; and
means for selecting a frame having a highest quality score as the representative frame for the scene.

20. The system of claim 17, wherein the means for determining a plurality of editing settings for each representative frame further comprises:
means for providing the representative frame for each scene to a preset selection model, wherein the preset selection model determines a content embedding for each representative frame and identifies similar images from an image library using the content embedding; and
means for identifying editing settings associated with each similar image to determine the plurality of editing settings.

* * * * *